US012699212B2

(12) United States Patent
Wilson et al.

(10) Patent No.: US 12,699,212 B2
(45) Date of Patent: Aug. 4, 2026

(54) LOW STATIC OPTICAL REMOVABLE LENS STACK

(71) Applicant: Laminated Film LLC, Las Vegas, NV (US)

(72) Inventors: Stephen S. Wilson, Las Vegas, NV (US); Bart E. Wilson, Las Vegas, NV (US)

(73) Assignee: Laminated Film, LLC, Las Vegas, NV (US)

( * ) Notice: Subject to any disclaimer, the term of this patent is extended or adjusted under 35 U.S.C. 154(b) by 0 days.

(21) Appl. No.: 18/920,469

(22) Filed: Oct. 18, 2024

(65) Prior Publication Data

US 2025/0044483 A1     Feb. 6, 2025

Related U.S. Application Data

(63) Continuation of application No. 18/474,860, filed on Sep. 26, 2023, now Pat. No. 12,153,228, which is a
(Continued)

(51) Int. Cl.
| | |
|---|---|
| *G02B 3/00* | (2006.01) |
| *A42B 3/20* | (2006.01) |
| *G02B 1/16* | (2015.01) |

(52) U.S. Cl.
CPC .............. *G02B 3/0068* (2013.01); *A42B 3/20* (2013.01); *G02B 1/16* (2015.01)

(58) Field of Classification Search
None
See application file for complete search history.

(56) References Cited

U.S. PATENT DOCUMENTS

| | | | |
|---|---|---|---|
| 1,337,036 A | 4/1920 | Bergmann | |
| 1,366,907 A | 2/1921 | Dunand | |

(Continued)

FOREIGN PATENT DOCUMENTS

| | | |
|---|---|---|
| AU | 2005244595 A1 | 7/2006 |
| AU | 2015277196 A1 | 1/2017 |

(Continued)

OTHER PUBLICATIONS

Prosecution History of U.S. Re-Examination Application No. 95/002,073 titled Touch Screen Protector; pp. 1-1,980.
(Continued)

*Primary Examiner* — Robert E. Tallman
(74) *Attorney, Agent, or Firm* — Stetina Garred Brucker & Newboles

(57) ABSTRACT

A removable lens stack comprises a base layer including a substrate and an antistatic coating comprising quaternary ammonium cations on a first side of the substrate and one or more removable lens layers stacked on top of the base layer. Each removable lens layer may include a substrate, an antistatic coating comprising quaternary ammonium cations on a first side of the substrate, and an adhesive on a second side of the substrate opposite the first side. The one or more removable lens layers may be stacked on top of the base layer such that the second side of the substrate of each removable lens layer faces the first side of the substrate of an immediately preceding layer. Refractive indices of the substrate of the base layer, the substrate of each removable lens layer, and the adhesive of each removable lens layer may be matched (e.g., to within 0.2).

21 Claims, 3 Drawing Sheets

Related U.S. Application Data continuation of application No. 18/163,200, filed on Feb. 1, 2023, now Pat. No. 11,808,952.

(60) Provisional application No. 63/377,155, filed on Sep. 26, 2022.

(56) References Cited

U.S. PATENT DOCUMENTS

| | | | |
|---|---|---|---|
| 2,138,086 A | 11/1938 | Blodjer |
| 2,248,331 A | 7/1941 | Blodjer |
| 2,328,687 A | 9/1943 | Serr |
| 2,339,280 A | 1/1944 | Madson |
| 2,354,415 A | 7/1944 | Woodard |
| 2,461,604 A | 2/1949 | Huntsman |
| 2,511,329 A | 6/1950 | Craig |
| 2,546,117 A | 3/1951 | Whelan |
| 2,563,125 A | 8/1951 | Malcom, Jr. |
| 2,569,715 A | 10/1951 | Green |
| 2,640,068 A | 5/1953 | Schaefer et al. |
| 2,736,109 A | 2/1956 | Scholl |
| 2,923,944 A | 2/1960 | Lindblom |
| 2,963,708 A | 12/1960 | Herbine et al. |
| 3,095,575 A | 7/1963 | Radov |
| 3,298,031 A | 1/1967 | Harold |
| 3,475,766 A | 11/1969 | Raschke |
| 3,577,565 A | 5/1971 | Feldmann et al. |
| 3,605,115 A | 9/1971 | Bohner |
| 3,685,054 A | 8/1972 | Raschke |
| 3,774,239 A | 11/1973 | Kotzar |
| 3,785,102 A | 1/1974 | Amos |
| 3,797,042 A | 3/1974 | Gager |
| 3,810,815 A | 5/1974 | Welhart et al. |
| 3,868,293 A | 2/1975 | Selph |
| 3,937,863 A | 2/1976 | Moore |
| 3,948,662 A | 4/1976 | Alston et al. |
| 3,950,580 A | 4/1976 | Boudet |
| 3,987,569 A | 10/1976 | Chase |
| 4,063,740 A | 12/1977 | Mader |
| 4,076,373 A | 2/1978 | Moretti |
| 4,090,464 A | 5/1978 | Bishopp et al. |
| D249,597 S | 9/1978 | Dillon |
| 4,138,746 A | 2/1979 | Bergmann |
| D254,638 S | 4/1980 | Bay, Jr. |
| 4,204,231 A | 5/1980 | Permenter |
| 4,248,762 A | 2/1981 | Hornibrook et al. |
| 4,248,918 A | 2/1981 | Hornibrook et al. |
| 4,268,134 A | 5/1981 | Gulati et al. |
| 4,273,098 A | 6/1981 | Silverstein |
| 4,301,193 A | 11/1981 | Zuk |
| 4,332,861 A | 6/1982 | Franz et al. |
| 4,333,983 A | 6/1982 | Allen |
| 4,380,563 A | 4/1983 | Ayotte |
| 4,528,701 A | 7/1985 | Smith |
| 4,557,980 A | 12/1985 | Hodnett, III |
| 4,582,764 A | 4/1986 | Allerd et al. |
| 4,625,341 A | 12/1986 | Broersma |
| 4,658,515 A | 4/1987 | Oatman |
| 4,696,860 A | 9/1987 | Epperson |
| 4,701,965 A | 10/1987 | Landis |
| 4,716,601 A | 1/1988 | Mcneal |
| 4,726,074 A | 2/1988 | Baclit et al. |
| 4,729,179 A | 3/1988 | Quist, Jr. |
| 4,769,265 A | 9/1988 | Coburn, Jr. |
| D299,767 S | 2/1989 | Hsin |
| 4,842,919 A | 6/1989 | David et al. |
| 4,850,049 A | 7/1989 | Landis et al. |
| 4,852,185 A | 8/1989 | Olson |
| 4,852,186 A | 8/1989 | Landis |
| 4,853,974 A | 8/1989 | Olim |
| 4,856,535 A | 8/1989 | Forbes |
| 4,864,653 A | 9/1989 | Landis |
| 4,867,178 A | 9/1989 | Smith |
| 4,884,296 A | 12/1989 | Nix, Jr. |
| 4,884,302 A | 12/1989 | Foehl |
| 4,889,754 A | 12/1989 | Vargas |
| D306,363 S | 2/1990 | Stackhouse et al. |
| 4,907,090 A | 3/1990 | Ananian |
| 4,911,964 A | 3/1990 | Corbo |
| D307,065 S | 4/1990 | Friedman |
| 4,920,576 A | 5/1990 | Landis |
| 4,934,792 A | 6/1990 | Tovi |
| 4,945,573 A | 8/1990 | Landis |
| 4,950,445 A | 8/1990 | Salce et al. |
| D311,263 S | 10/1990 | Russell |
| 4,964,171 A | 10/1990 | Landis |
| 4,965,887 A | 10/1990 | Paoluccio et al. |
| 4,973,511 A | 11/1990 | Farmer et al. |
| 4,975,981 A | 12/1990 | Ray |
| 5,000,528 A | 3/1991 | Kawakatsu |
| 5,002,326 A | 3/1991 | Spicer et al. |
| D318,147 S | 7/1991 | Russell |
| 5,035,004 A | 7/1991 | Koester |
| D319,449 S | 8/1991 | Millar |
| 5,046,195 A | 9/1991 | Koritan |
| D321,268 S | 10/1991 | Nix, Jr. |
| 5,052,054 A | 10/1991 | Birum |
| 5,054,480 A | 10/1991 | Bare et al. |
| 5,067,475 A | 11/1991 | Posnansky |
| 5,071,206 A | 12/1991 | Hood et al. |
| H1023 H | 3/1992 | Wiseman |
| 5,104,929 A | 4/1992 | Bilkadi |
| 5,113,528 A | 5/1992 | Burke, Jr. et al. |
| 5,162,046 A | 11/1992 | Mercado |
| D331,820 S | 12/1992 | Scanlon |
| D333,366 S | 2/1993 | Brown |
| 5,183,700 A | 2/1993 | Austin |
| 5,194,293 A | 3/1993 | Foster |
| 5,201,077 A | 4/1993 | Dondlinger |
| 5,206,956 A | 5/1993 | Olson |
| 5,208,916 A | 5/1993 | Kelman |
| 5,239,406 A | 8/1993 | Lynam |
| 5,318,685 A | 6/1994 | O'Shaughnessy |
| D349,177 S | 7/1994 | Russell |
| D349,178 S | 7/1994 | Russell |
| 5,327,180 A | 7/1994 | Hester, III et al. |
| D349,362 S | 8/1994 | Russell |
| 5,364,671 A | 11/1994 | Gustafson |
| 5,365,615 A | 11/1994 | Piszkin |
| D353,691 S | 12/1994 | Scanlon |
| D354,588 S | 1/1995 | Russell |
| D354,589 S | 1/1995 | Russell |
| 5,420,649 A | 5/1995 | Lewis |
| D359,586 S | 6/1995 | Lofton |
| D361,160 S | 8/1995 | Russell |
| 5,443,877 A | 8/1995 | Kramer et al. |
| D362,086 S | 9/1995 | Russell |
| 5,468,247 A | 11/1995 | Matthai et al. |
| 5,471,036 A | 11/1995 | Sperbeck |
| 5,473,778 A | 12/1995 | Bell |
| 5,486,883 A | 1/1996 | Candido |
| 5,507,332 A | 4/1996 | McKinnon |
| 5,510,173 A | 4/1996 | Pass et al. |
| 5,512,116 A | 4/1996 | Campfield |
| 5,523,132 A | 6/1996 | Zhang et al. |
| RE35,318 E | 8/1996 | Warman |
| 5,544,361 A | 8/1996 | Fine et al. |
| 5,553,608 A | 9/1996 | Reese et al. |
| 5,555,570 A | 9/1996 | Bay |
| 5,557,683 A | 9/1996 | Eubanks |
| 5,584,130 A | 12/1996 | Perron |
| 5,592,698 A | 1/1997 | Woods |
| 5,593,786 A | 1/1997 | Parker et al. |
| 5,622,580 A | 4/1997 | Mannheim |
| 5,633,049 A | 5/1997 | Bilkadi et al. |
| 5,668,612 A | 9/1997 | Hung |
| 5,671,483 A | 9/1997 | Reuber |
| 5,673,431 A | 10/1997 | Batty |
| 5,687,420 A | 11/1997 | Chong |
| 5,694,650 A | 12/1997 | Hong |
| 5,702,415 A | 12/1997 | Matthai et al. |
| 5,709,825 A | 1/1998 | Shih |
| 5,740,560 A | 4/1998 | Muoio |
| 5,792,535 A | 8/1998 | Weder |
| 5,806,102 A | 9/1998 | Park |

(56)  References Cited

U.S. PATENT DOCUMENTS

| | | | |
|---|---|---|---|
| 5,815,848 A | 10/1998 | Jarvis | |
| 5,819,311 A | 10/1998 | Lo | |
| 5,846,659 A | 12/1998 | Hartmut et al. | |
| D404,849 S | 1/1999 | Desy | |
| 5,885,704 A | 3/1999 | Peiffer et al. | |
| 5,896,991 A | 4/1999 | Hippely et al. | |
| 5,924,129 A | 7/1999 | Gill | |
| 5,937,596 A | 8/1999 | Leeuwenburgh et al. | |
| 5,956,175 A | 9/1999 | Hojnowski | |
| 5,972,453 A | 10/1999 | Akiwa et al. | |
| 5,991,072 A | 11/1999 | Solyntjes et al. | |
| 5,991,081 A | 11/1999 | Haaland et al. | |
| 5,991,930 A | 11/1999 | Sorrentino | |
| D418,256 S | 12/1999 | Caruana | |
| 6,008,299 A | 12/1999 | Mcgrath et al. | |
| 6,049,419 A | 4/2000 | Wheatley et al. | |
| 6,085,358 A | 7/2000 | Cogan | |
| 6,173,447 B1 | 1/2001 | Arnold | |
| 6,217,099 B1 | 4/2001 | Mckinney et al. | |
| 6,221,112 B1 | 4/2001 | Snider | |
| 6,237,147 B1 | 5/2001 | Brockman | |
| 6,250,765 B1 | 6/2001 | Murakami | |
| 6,305,073 B1 | 10/2001 | Badders | |
| 6,347,401 B1 | 2/2002 | Joyce | |
| 6,375,865 B1 | 4/2002 | Paulson et al. | |
| 6,378,133 B1 | 4/2002 | Daikuzono | |
| 6,381,750 B1 | 5/2002 | Mangan | |
| 6,385,776 B2 | 5/2002 | Linday | |
| 6,388,813 B1 * | 5/2002 | Wilson | B32B 37/12 |
| | | | 359/630 |
| 6,403,005 B1 | 6/2002 | Mientus et al. | |
| 6,416,872 B1 | 7/2002 | Maschwitz | |
| 6,432,522 B1 | 8/2002 | Friedman et al. | |
| 6,461,709 B1 * | 10/2002 | Janssen | B32B 17/10009 |
| | | | 160/370.21 |
| 6,469,752 B1 | 10/2002 | Ishikawa et al. | |
| 6,481,019 B2 | 11/2002 | Diaz et al. | |
| 6,491,390 B1 | 12/2002 | Provost | |
| 6,531,180 B1 | 3/2003 | Takushima et al. | |
| 6,536,045 B1 | 3/2003 | Wilson et al. | |
| 6,536,589 B2 | 3/2003 | Chang | |
| 6,555,235 B1 | 4/2003 | Aufderheide et al. | |
| 6,559,902 B1 | 5/2003 | Kusuda et al. | |
| 6,576,349 B2 | 6/2003 | Lingle et al. | |
| 6,584,614 B2 | 7/2003 | Hogg | |
| 6,592,950 B1 | 7/2003 | Toshima et al. | |
| 6,614,423 B1 | 9/2003 | Wong et al. | |
| 6,622,311 B2 | 9/2003 | Diaz et al. | |
| D480,838 S | 10/2003 | Martin | |
| 6,654,071 B2 | 11/2003 | Chen | |
| 6,660,389 B2 | 12/2003 | Liu et al. | |
| 6,662,371 B2 | 12/2003 | Shin | |
| 6,667,738 B2 | 12/2003 | Murphy | |
| 6,739,718 B1 | 5/2004 | Jung | |
| 6,745,396 B1 | 6/2004 | Landis et al. | |
| 6,750,922 B1 | 6/2004 | Benning | |
| 6,773,778 B2 | 8/2004 | Onozawa et al. | |
| 6,773,816 B2 | 8/2004 | Tsutsumi | |
| 6,777,055 B2 | 8/2004 | Janssen et al. | |
| 6,800,378 B2 | 10/2004 | Hawa et al. | |
| 6,838,610 B2 | 1/2005 | De Moraes | |
| 6,841,190 B2 | 1/2005 | Liu et al. | |
| 6,847,492 B2 | 1/2005 | Wilson et al. | |
| 6,864,882 B2 | 3/2005 | Newton | |
| 6,870,686 B2 | 3/2005 | Wilson et al. | |
| 6,879,319 B2 | 4/2005 | Cok | |
| 6,907,617 B2 | 6/2005 | Johnson | |
| 6,911,593 B2 | 6/2005 | Mazumder et al. | |
| 6,922,850 B1 | 8/2005 | Arnold | |
| 6,952,950 B2 | 10/2005 | Doe et al. | |
| 6,967,044 B1 | 11/2005 | O'Brien | |
| D512,797 S | 12/2005 | Canavan et al. | |
| 6,973,677 B2 | 12/2005 | Diaz et al. | |
| 6,995,976 B2 | 2/2006 | Richardson | |
| 7,070,837 B2 | 7/2006 | Ross | |
| 7,071,927 B2 | 7/2006 | Blanchard | |
| D526,446 S | 8/2006 | Cowan et al. | |
| 7,097,080 B2 | 8/2006 | Cox | |
| 7,101,810 B2 | 9/2006 | Bond et al. | |
| 7,103,920 B1 | 9/2006 | Otterson | |
| 7,143,979 B2 | 12/2006 | Wood et al. | |
| 7,184,217 B2 | 2/2007 | Wilson et al. | |
| D541,991 S | 5/2007 | Lawrence | |
| 7,215,473 B2 | 5/2007 | Fleming | |
| 7,226,176 B1 | 6/2007 | Huang | |
| 7,238,401 B1 | 7/2007 | Dietz | |
| 7,311,956 B2 | 12/2007 | Pitzen | |
| D559,442 S | 1/2008 | Regelbrugge et al. | |
| 7,344,241 B2 | 3/2008 | Baek | |
| 7,351,470 B2 | 4/2008 | Draheim et al. | |
| D569,557 S | 5/2008 | Cho | |
| 7,389,869 B2 | 6/2008 | Mason, Jr. | |
| 7,410,684 B2 | 8/2008 | Mccormick | |
| 7,425,369 B2 | 9/2008 | Oakey et al. | |
| 7,469,423 B2 * | 12/2008 | Hughes | A61F 9/025 |
| | | | 2/15 |
| D586,052 S | 2/2009 | Elias | |
| 7,495,895 B2 | 2/2009 | Carnevali | |
| 7,597,441 B1 | 10/2009 | Farwig | |
| 7,629,052 B2 | 12/2009 | Brumwell | |
| 7,631,365 B1 | 12/2009 | Mahan | |
| 7,663,047 B2 | 2/2010 | Hanuschak | |
| 7,709,095 B2 | 5/2010 | Persoone et al. | |
| 7,722,921 B2 | 5/2010 | Shimoda et al. | |
| 7,727,615 B2 | 6/2010 | Kato et al. | |
| 7,735,156 B2 | 6/2010 | VanDerWoude et al. | |
| 7,752,682 B2 | 7/2010 | Vanderwoude et al. | |
| 7,812,077 B2 | 10/2010 | Borade et al. | |
| 7,858,001 B2 | 12/2010 | Qin et al. | |
| 7,937,775 B2 | 5/2011 | Manzella, Jr. et al. | |
| 7,957,524 B2 | 6/2011 | Chipping | |
| 8,024,818 B1 | 9/2011 | Davenport | |
| 8,044,942 B1 | 10/2011 | Leonhard et al. | |
| 8,101,277 B2 | 1/2012 | Logan et al. | |
| 8,234,722 B2 | 8/2012 | VanDerWoude et al. | |
| 8,261,375 B1 * | 9/2012 | Reaux | A41D 13/1184 |
| | | | 128/201.15 |
| 8,282,234 B2 | 10/2012 | VanDerWoude et al. | |
| 8,292,347 B1 | 10/2012 | Drake | |
| 8,294,843 B2 | 10/2012 | Hollaway | |
| 8,316,470 B2 | 11/2012 | McNeal et al. | |
| 8,361,260 B2 | 1/2013 | Wilson et al. | |
| 8,407,818 B2 | 4/2013 | VanDerWoude et al. | |
| D683,077 S | 5/2013 | Klotz et al. | |
| 8,455,105 B2 | 6/2013 | Hobeika et al. | |
| D692,187 S | 10/2013 | Isobe | |
| D692,189 S | 10/2013 | Isobe | |
| 8,567,596 B1 | 10/2013 | Mason, Jr. | |
| 8,693,102 B2 | 4/2014 | Wilson et al. | |
| 8,819,869 B2 | 9/2014 | VanDerWoude et al. | |
| 8,889,801 B2 | 11/2014 | Liao et al. | |
| 8,918,198 B2 | 12/2014 | Atanasoff | |
| 8,974,620 B2 | 3/2015 | Wilson et al. | |
| D726,378 S | 4/2015 | Wako | |
| 8,999,509 B2 | 4/2015 | Port et al. | |
| 9,023,162 B2 | 5/2015 | Mccormick et al. | |
| 9,104,256 B2 | 8/2015 | Wilson et al. | |
| 9,128,545 B2 | 9/2015 | Wilson et al. | |
| 9,150,763 B2 | 10/2015 | Lopez et al. | |
| 9,161,858 B2 | 10/2015 | Capers et al. | |
| 9,170,415 B2 | 10/2015 | Mansuy | |
| 9,173,437 B2 | 11/2015 | VanDerWoude et al. | |
| 9,204,823 B2 | 12/2015 | Derenne et al. | |
| 9,274,625 B2 | 3/2016 | Wilson et al. | |
| 9,295,297 B2 | 3/2016 | Wilson | |
| D759,900 S | 6/2016 | Cummings et al. | |
| 9,442,306 B1 | 9/2016 | Hines et al. | |
| 9,471,163 B2 | 10/2016 | Wilson et al. | |
| 9,526,290 B2 | 12/2016 | Wilson | |
| 9,575,231 B2 | 2/2017 | Chu et al. | |
| D781,507 S | 3/2017 | Huh | |
| D781,508 S | 3/2017 | Huh | |
| 9,629,407 B2 | 4/2017 | Foster | |
| 9,671,622 B1 | 6/2017 | Vetrini et al. | |

(56) References Cited

U.S. PATENT DOCUMENTS

| | | |
|---|---|---|
| 9,706,808 B2 | 7/2017 | Sclafani et al. |
| 9,726,940 B2 | 8/2017 | Tomiyasu |
| D805,256 S | 12/2017 | Yang |
| 9,905,297 B2 | 2/2018 | Best |
| D815,190 S | 4/2018 | Dellemann |
| 9,968,155 B2 | 5/2018 | Wilson |
| 10,070,678 B2 | 9/2018 | Wilson |
| 10,165,819 B2 | 1/2019 | Klotz et al. |
| 10,201,207 B2 | 2/2019 | VanDerWoude et al. |
| 10,226,095 B2 | 3/2019 | Wilson |
| 10,227,501 B2 | 3/2019 | Hwang et al. |
| D849,240 S | 5/2019 | Guo et al. |
| D850,256 S | 6/2019 | Ryszawy |
| 10,321,731 B2 | 6/2019 | Wilson |
| 10,345,934 B2 | 7/2019 | Wilson et al. |
| 10,384,084 B2 | 8/2019 | Isham et al. |
| 10,427,385 B2 | 10/2019 | Wilson et al. |
| 10,449,397 B2 | 10/2019 | VanDerWoude et al. |
| 10,520,756 B2 | 12/2019 | Gallina et al. |
| 10,537,236 B2 | 1/2020 | Bennett et al. |
| D879,384 S | 3/2020 | Sato |
| D882,182 S | 4/2020 | Fekete |
| 10,620,670 B2 | 4/2020 | Wilson et al. |
| 10,687,569 B1 | 6/2020 | Mcdirmid |
| 10,716,986 B2 | 7/2020 | Winter et al. |
| 10,871,661 B2 | 12/2020 | Saylor et al. |
| 10,874,163 B2 | 12/2020 | VanDerWoude et al. |
| D907,299 S | 1/2021 | Brown, II et al. |
| D907,300 S | 1/2021 | Brown, II et al. |
| D925,129 S | 7/2021 | Wilson |
| D925,834 S | 7/2021 | Babin et al. |
| 11,090,516 B2 | 8/2021 | VanDerWoude et al. |
| 11,141,959 B2 | 10/2021 | Wilson et al. |
| 11,147,323 B1 | 10/2021 | Wilson |
| 11,307,329 B1 | 4/2022 | Wilson |
| 11,480,801 B1 | 10/2022 | Morris et al. |
| 11,490,667 B1 | 11/2022 | Wilson |
| 11,510,718 B2 | 11/2022 | Childers et al. |
| 11,548,356 B2 | 1/2023 | Wilson et al. |
| 11,579,339 B2 | 2/2023 | Thothadri et al. |
| 11,589,633 B2 * | 2/2023 | Jascomb ................. B29C 48/21 |
| 11,709,296 B2 | 7/2023 | Wilson et al. |
| 11,723,420 B2 | 8/2023 | Wilson et al. |
| 11,807,078 B2 | 11/2023 | Wilson et al. |
| 11,912,001 B2 | 2/2024 | Wilson et al. |
| 11,988,850 B2 | 5/2024 | Wilson et al. |
| 12,077,037 B2 | 9/2024 | Wilson et al. |
| 12,162,330 B2 | 12/2024 | Wilson et al. |
| 2001/0035936 A1 | 11/2001 | Maisnik |
| 2002/0025441 A1 | 2/2002 | Hieda et al. |
| 2002/0036362 A1 | 3/2002 | Chigira et al. |
| 2002/0101411 A1 | 8/2002 | Chang |
| 2002/0109922 A1 | 8/2002 | Wilson |
| 2002/0114934 A1 | 8/2002 | Liu et al. |
| 2002/0122925 A1 | 9/2002 | Liu et al. |
| 2002/0159159 A1 | 10/2002 | Wilson et al. |
| 2002/0195910 A1 | 12/2002 | Hus et al. |
| 2003/0012936 A1 | 1/2003 | Draheim et al. |
| 2003/0087054 A1 | 5/2003 | Janssen et al. |
| 2003/0110613 A1 | 6/2003 | Ross |
| 2004/0004605 A1 | 1/2004 | David |
| 2004/0109096 A1 | 6/2004 | Anderson et al. |
| 2004/0121105 A1 | 6/2004 | Janssen et al. |
| 2004/0139530 A1 | 7/2004 | Yan |
| 2004/0202812 A1 | 10/2004 | Congard et al. |
| 2004/0227722 A1 | 11/2004 | Friberg et al. |
| 2004/0238690 A1 | 12/2004 | Wood et al. |
| 2004/0246386 A1 | 12/2004 | Thomas et al. |
| 2004/0258933 A1 | 12/2004 | Enniss et al. |
| 2005/0002108 A1 | 1/2005 | Wilson et al. |
| 2005/0015860 A1 | 1/2005 | Reaux |
| 2005/0071909 A1 | 4/2005 | Diaz et al. |
| 2005/0133035 A1 | 6/2005 | Yahiaoui et al. |
| 2005/0180877 A1 | 8/2005 | Usami et al. |
| 2005/0186415 A1 | 8/2005 | Mccormick et al. |
| 2005/0188821 A1 | 9/2005 | Yamashita et al. |
| 2005/0200154 A1 | 9/2005 | Barbee et al. |
| 2005/0249957 A1 | 11/2005 | Jing et al. |
| 2005/0260343 A1 | 11/2005 | Han |
| 2006/0024494 A1 | 2/2006 | Amano et al. |
| 2006/0052167 A1 | 3/2006 | Boddicker et al. |
| 2006/0056030 A1 | 3/2006 | Fukuda et al. |
| 2006/0057399 A1 | 3/2006 | Persoone et al. |
| 2006/0114245 A1 | 6/2006 | Masters et al. |
| 2006/0138694 A1 | 6/2006 | Biernath et al. |
| 2006/0158609 A1 | 7/2006 | Heil |
| 2006/0177654 A1 | 8/2006 | Shoshi |
| 2006/0204776 A1 | 9/2006 | Chen et al. |
| 2006/0254088 A1 | 11/2006 | Mccormick |
| 2006/0285218 A1 | 12/2006 | Wilson et al. |
| 2007/0019300 A1 | 1/2007 | Wilson et al. |
| 2007/0181456 A1 | 8/2007 | Kusuda et al. |
| 2007/0211002 A1 | 9/2007 | Zehner et al. |
| 2007/0212508 A1 | 9/2007 | Mase |
| 2007/0229962 A1 | 10/2007 | Mason |
| 2007/0234592 A1 | 10/2007 | Crates |
| 2007/0234888 A1 | 10/2007 | Rotolo De Moraes |
| 2007/0286995 A1 | 12/2007 | Li et al. |
| 2008/0014446 A1 | 1/2008 | Donea et al. |
| 2008/0030631 A1 | 2/2008 | Gallagher |
| 2008/0030675 A1 | 2/2008 | Dillon |
| 2008/0055258 A1 | 3/2008 | Sauers |
| 2008/0118678 A1 | 5/2008 | Huang et al. |
| 2008/0151177 A1 | 6/2008 | Wang |
| 2008/0160321 A1 | 7/2008 | Padiyath et al. |
| 2008/0176018 A1 | 7/2008 | Enniss et al. |
| 2008/0192351 A1 | 8/2008 | Miyagawa |
| 2008/0231979 A1 | 9/2008 | Chen |
| 2008/0256688 A1 | 10/2008 | Bruce |
| 2008/0286500 A1 | 11/2008 | Sussner et al. |
| 2008/0292820 A1 | 11/2008 | Padiyath et al. |
| 2009/0011205 A1 | 1/2009 | Thiel |
| 2009/0026095 A1 | 1/2009 | Lofland et al. |
| 2009/0054115 A1 | 2/2009 | Horrdin et al. |
| 2009/0086415 A1 | 4/2009 | Chipping |
| 2009/0087655 A1 | 4/2009 | Yamada et al. |
| 2009/0105437 A1 | 4/2009 | Determan et al. |
| 2009/0119819 A1 | 5/2009 | Thompson |
| 2009/0181242 A1 | 7/2009 | Enniss et al. |
| 2009/0233032 A1 | 9/2009 | Craig |
| 2009/0239045 A1 | 9/2009 | Kato et al. |
| 2009/0239048 A1 | 9/2009 | Sugihara et al. |
| 2010/0026646 A1 | 2/2010 | Xiao et al. |
| 2010/0033442 A1 | 2/2010 | Kusuda et al. |
| 2010/0102197 A1 | 4/2010 | Mcintyre |
| 2010/0102476 A1 | 4/2010 | Higgins |
| 2010/0122402 A1 | 5/2010 | Tipp |
| 2010/0146679 A1 | 6/2010 | Heil |
| 2010/0238119 A1 | 9/2010 | Dubrovsky et al. |
| 2010/0245273 A1 | 9/2010 | Hwang et al. |
| 2010/0270189 A1 | 10/2010 | Pedersen, II et al. |
| 2011/0007388 A1 | 1/2011 | Wilson et al. |
| 2011/0010994 A1 | 1/2011 | Wilson et al. |
| 2011/0012841 A1 | 1/2011 | Lin |
| 2011/0013273 A1 | 1/2011 | Wilson et al. |
| 2011/0014481 A1 | 1/2011 | Wilson et al. |
| 2011/0035936 A1 | 2/2011 | Lee |
| 2011/0052864 A1 | 3/2011 | Son |
| 2011/0097574 A1 | 4/2011 | Faldysta et al. |
| 2011/0119801 A1 | 5/2011 | Wright |
| 2011/0165361 A1 | 7/2011 | Sherman et al. |
| 2011/0168261 A1 | 7/2011 | Welser et al. |
| 2011/0267793 A1 | 11/2011 | Cohen et al. |
| 2011/0271497 A1 | 11/2011 | Suh et al. |
| 2011/0277361 A1 | 11/2011 | Nichol et al. |
| 2011/0279383 A1 | 11/2011 | Wilson et al. |
| 2012/0003431 A1 | 1/2012 | Huang |
| 2012/0030095 A1 | 2/2012 | Marshall et al. |
| 2012/0047614 A1 | 3/2012 | Choi |
| 2012/0070603 A1 | 3/2012 | Hsu |
| 2012/0081792 A1 | 4/2012 | Neuffer |
| 2012/0137414 A1 | 6/2012 | Saylor |
| 2012/0149561 A1 | 6/2012 | Ribi et al. |
| 2012/0180204 A1 | 7/2012 | Hawkins |

(56) References Cited

U.S. PATENT DOCUMENTS

| | | |
|---|---|---|
| 2012/0183712 A1 | 7/2012 | Leonhard et al. |
| 2012/0188743 A1 | 7/2012 | Wilson et al. |
| 2012/0200816 A1 | 8/2012 | Krasnov et al. |
| 2012/0291173 A1 | 11/2012 | Gleason et al. |
| 2013/0045371 A1 | 2/2013 | O'Donnell |
| 2013/0083285 A1 | 4/2013 | McNeal et al. |
| 2013/0089688 A1 | 4/2013 | Wilson et al. |
| 2013/0098543 A1 | 4/2013 | Reuter et al. |
| 2013/0141693 A1 | 6/2013 | McCabe et al. |
| 2013/0145525 A1 | 6/2013 | Arenson et al. |
| 2013/0222913 A1 | 8/2013 | Tomoda et al. |
| 2013/0247286 A1 | 9/2013 | Vanderwoude et al. |
| 2013/0293959 A1 | 11/2013 | Mcdonald |
| 2014/0020153 A1 | 1/2014 | Romanski et al. |
| 2014/0050909 A1 | 2/2014 | Choi et al. |
| 2014/0121105 A1* | 5/2014 | Herzog .................. A01N 25/22 |
| | | 504/149 |
| 2014/0220283 A1 | 8/2014 | Wilson et al. |
| 2014/0259321 A1 | 9/2014 | Arnold |
| 2014/0289937 A1 | 10/2014 | Capers et al. |
| 2015/0033431 A1 | 2/2015 | Hofer Kraner et al. |
| 2015/0103474 A1 | 4/2015 | Cho |
| 2015/0131047 A1 | 5/2015 | Saylor et al. |
| 2015/0183178 A1* | 7/2015 | Lindquist ............... B32B 27/36 |
| | | 428/137 |
| 2015/0202847 A1 | 7/2015 | Johnson et al. |
| 2015/0234209 A1 | 8/2015 | Miyamoto et al. |
| 2015/0258715 A1 | 9/2015 | Ohta |
| 2015/0294656 A1 | 10/2015 | Hanuschak |
| 2015/0309609 A1 | 10/2015 | Wilson et al. |
| 2015/0349147 A1 | 12/2015 | Xi et al. |
| 2015/0359675 A1 | 12/2015 | Wilson |
| 2016/0023442 A1* | 1/2016 | Faris ....................... B32B 27/40 |
| | | 428/447 |
| 2016/0050990 A1 | 2/2016 | Hayes |
| 2016/0073720 A1 | 3/2016 | Niedrich |
| 2016/0231834 A1 | 8/2016 | Hardi |
| 2016/0259102 A1 | 9/2016 | Taka |
| 2016/0271922 A1 | 9/2016 | Uzawa et al. |
| 2016/0291543 A1 | 10/2016 | Saito |
| 2016/0318227 A1 | 11/2016 | Kim et al. |
| 2017/0052286 A1 | 2/2017 | Hines et al. |
| 2017/0071792 A1* | 3/2017 | Wilson .................... A61F 9/025 |
| 2017/0079364 A1 | 3/2017 | Paulson |
| 2017/0129219 A1 | 5/2017 | Uebelacker et al. |
| 2017/0173923 A1 | 6/2017 | Davis et al. |
| 2017/0192131 A1 | 7/2017 | Wilson et al. |
| 2017/0208878 A1 | 7/2017 | Kakinuma et al. |
| 2017/0232713 A1 | 8/2017 | Mannheim Astete et al. |
| 2017/0281414 A1 | 10/2017 | Wilson |
| 2017/0299898 A1 | 10/2017 | Gallina et al. |
| 2017/0318877 A1 | 11/2017 | Yahiaoui et al. |
| 2018/0029337 A1 | 2/2018 | Wilson et al. |
| 2018/0042324 A1 | 2/2018 | King |
| 2018/0052334 A1 | 2/2018 | Repko |
| 2018/0094164 A1 | 4/2018 | Ito et al. |
| 2018/0148578 A1 | 5/2018 | Ohta et al. |
| 2018/0161208 A1 | 6/2018 | Huh |
| 2018/0229480 A1 | 8/2018 | Chung |
| 2018/0236753 A1 | 8/2018 | Wykoff et al. |
| 2018/0295925 A1 | 10/2018 | Gagliardo et al. |
| 2018/0338550 A1 | 11/2018 | Boulware et al. |
| 2019/0021430 A1 | 1/2019 | Elliott |
| 2019/0037948 A1 | 2/2019 | Romanski et al. |
| 2019/0116300 A1 | 4/2019 | Okuno |
| 2019/0118057 A1 | 4/2019 | Winter et al. |
| 2019/0209912 A1 | 7/2019 | Isserow et al. |
| 2019/0212474 A1 | 7/2019 | Le Quang et al. |
| 2019/0346591 A1 | 11/2019 | Thothadri et al. |
| 2019/0389182 A1 | 12/2019 | Wilson et al. |
| 2020/0100657 A1 | 4/2020 | Lee et al. |
| 2020/0115519 A1 | 4/2020 | Phillips et al. |
| 2020/0124768 A1 | 4/2020 | Wilson |
| 2020/0134773 A1 | 4/2020 | Pinter et al. |
| 2020/0154808 A1 | 5/2020 | Inouye |
| 2020/0178622 A1 | 6/2020 | Jascomb et al. |
| 2020/0247102 A1 | 8/2020 | Wilson et al. |
| 2020/0261055 A1 | 8/2020 | Zwierstra et al. |
| 2020/0281301 A1 | 9/2020 | Wynalda, Jr. |
| 2020/0310494 A1 | 10/2020 | Ahn et al. |
| 2020/0359718 A1 | 11/2020 | Jefferis et al. |
| 2020/0375272 A1 | 12/2020 | Ulmer et al. |
| 2020/0384747 A1 | 12/2020 | Fukuda et al. |
| 2021/0030095 A1 | 2/2021 | Reicher |
| 2021/0162645 A1 | 6/2021 | Wilson et al. |
| 2021/0283994 A1 | 9/2021 | Wilson |
| 2021/0298380 A1 | 9/2021 | Brown et al. |
| 2021/0298390 A1 | 9/2021 | Sup, IV et al. |
| 2021/0307425 A1 | 10/2021 | Keim |
| 2021/0315291 A1 | 10/2021 | Votolato et al. |
| 2021/0318553 A1 | 10/2021 | Gharabegian |
| 2021/0321692 A1 | 10/2021 | Wilson |
| 2021/0321693 A1 | 10/2021 | Wilson et al. |
| 2021/0329999 A1 | 10/2021 | Ackerman |
| 2021/0368886 A1 | 12/2021 | Swart et al. |
| 2021/0386155 A1 | 12/2021 | Rose |
| 2021/0393440 A1 | 12/2021 | Leatt et al. |
| 2021/0394427 A1 | 12/2021 | Frisco et al. |
| 2022/0015472 A1 | 1/2022 | Boza |
| 2023/0106407 A1 | 4/2023 | Arima et al. |

FOREIGN PATENT DOCUMENTS

| | | |
|---|---|---|
| CA | 2386043 A1 | 11/2003 |
| DE | 3637188 A1 | 5/1988 |
| DE | 19808535 A1 | 9/1999 |
| DE | 202004010014 U1 | 4/2005 |
| DE | 202020101562 U1 | 4/2020 |
| DE | 202020101794 U1 | 4/2020 |
| EP | 192075 A2 | 8/1986 |
| EP | 671258 A2 | 9/1995 |
| EP | 1471415 A2 | 10/2004 |
| EP | 1517791 A2 | 3/2005 |
| EP | 1047537 B1 | 3/2010 |
| EP | 3157480 A1 | 4/2017 |
| GB | 2310862 A | 9/1997 |
| GB | 2492574 A | 1/2013 |
| JP | 61017860 A | 1/1986 |
| JP | S6117860 A | 1/1986 |
| JP | 62053832 A | 3/1987 |
| JP | 04314537 A | 11/1992 |
| JP | 06143496 A | 5/1994 |
| JP | 07021456 A | 1/1995 |
| JP | 10167765 A | 6/1998 |
| JP | 2000334812 A | 12/2000 |
| JP | 2002019039 A | 1/2002 |
| JP | 2002328613 A | 11/2002 |
| JP | 2012183822 A | 9/2012 |
| JP | 2014032222 A | 2/2014 |
| JP | 2015128896 A | 7/2015 |
| JP | 2015193259 A | 11/2015 |
| JP | 2018200329 A | 12/2018 |
| JP | 6767596 B1 | 10/2020 |
| KR | 20120001292 A | 1/2012 |
| TW | 200700793 A | 1/2007 |
| TW | 201027992 A | 7/2010 |
| WO | 0024576 A1 | 5/2000 |
| WO | 03052678 A1 | 6/2003 |
| WO | 2009008857 A1 | 1/2009 |
| WO | 2015009114 A1 | 1/2015 |
| WO | 2015091425 A1 | 6/2015 |
| WO | 2015093413 A1 | 6/2015 |
| WO | 2015195814 A1 | 12/2015 |
| WO | 2019006151 A1 | 1/2019 |
| WO | 2019055267 A1 | 3/2019 |
| WO | 2021176316 A1 | 9/2021 |

OTHER PUBLICATIONS www.store.moshimode.com; "iVisor AG for iPad 2 Black"; 2004-2010.

Defendant's Motion for Summary Judgment; Oct. 25, 2013; pp. 1-31.

(56)            References Cited

OTHER PUBLICATIONS

Jake Gaecke; "Appletell Reviews the iVisor for iPad"; www.appletell.com; Sep. 15, 2010 at 12:32 p.m. www.technologytell.com/apple/60407/appletell-reviews-ag-for-ipad/; 2 pages.
www.nushield.com/technology.php; "What Makes NuShield Screen Protectors Superior", 2 pages.
www.spigen.com; "Something You Want"; 2 pages.
www.zagg.com; "Apple iPad 2 (Wi-Fi 3G) Screen Protector"; 2 pages.
www.gadgetguard.com; "Invisible Gadget Guard, the Original"; 1 page.
www.incipotech.com; "Protect Your iPhone 4 with Screen Protectors from Incipo"; 3 pages.
www.store.moshimonde.com; "iVisor AG iPad Screen Protector"; Jul. 2010; 7 pages.
www.store.moshimonde.com; "iVisor XT Crystal Clear Protector for iPad"; Aug. 2010; 3 pages.
www.store.moshimonde.com; "iVisor AG for iPad 2 Black"; Mar. 2011; 5 pages.
www.store.moshimonde.com; "iVisor AG for iPad 2 White"; Mar. 2011; 3 pages.
www.store.moshimonde.com; "iVisor AG for iPhone 4/4S Black"; Nov. 2010; 5 pages.
www.store.moshimonde.com; "iVisor AG for iPhone 4/4S White"; May 2010; 4 pages.
Dictionary.com (http://dictionary.reference.com) 2012.
*Racing Optics, Inc.* v. *Aevoe, Inc.*, d/b/a/ MOSHI; Case No. 15-cv-017744-JCM-VCF; Aevoe's Initial Disclosure Non-Infringement, Invalidity and Unenforceability Contentions (Redacted) dated Jan. 7, 2016.
Defendant Aevoe Corp.'s Non-Infringement Contentions and Responses to Racing Optic's Disclosure of Asserted Claims and Infringement Contentions (U.S. Pat. No. 9,128,545) dated Jan. 7, 2016.
Defendant Aevoe Corp.'s Non-Infringement Contentions and Responses to Racing Optic's Disclosure of Asserted Claims and Infringement Contentions (U.S. Pat. No. 9,104,256) dated Jan. 7, 2016.
Defendant Aevoe Corp.'s Non-Infringement Contentions and Responses to Racing Optic's Disclosure of Asserted Claims and Infringement Contentions (U.S. Pat. No. 8,974,620) dated Jan. 7, 2016.
*I-Blason LLC* v. *Aevoe, Inc. and Aevoe Corp.*; Case IPR2016-TBA; Petition for Inter Partes Review of U.S. Pat. No. 8,044,942 (including Exhibits 1001-1019).
Dupont Teijin Films, "Mylar Polyester Film—Optical Properties", Jun. 2003, 2 pages.
https://en.wikipedia.org/wiki/Black_body, "Black Body", Jul. 2009, 11 pages.
https://en.wikipedia.org/wiki/Infrared, "Infrared", Jul. 2009, 12 pages.
https://en.wikipedia.org/wiki/BoPET, "PET Film (biaxially oriented)", Jul. 2009, 4 pages.
Instashield LLC, Bionic Wrench® Inventor Creates Low-Cost Face Shield for Masses, Apr. 15, 2020, 3 pages.
Tom Zillich, Surrey manufacturer hopes to hit home run with face shield that clips to baseball cap, Apr. 29, 2020, 3 pages.
Opentip, Opromo Safety Face Shield Visor for Adult Kids, Protective Cotton Hat with Removable PVC Face Cover <https://www.opentip.com/product.php?products_id=11699030>, May 5, 2020, 3 pages.
Hefute, Hefute 5 PCS Protective Face Cover with Shield Comfortable Full Protection Face Compatiable with Glasses Anti-Droplet Anti-Pollution and Windproof Transparent Safety Face Cover with Shield(Style B) <https://www.amazon.com/dp/B086GSG8DH/ref=sspa_dk_detail_9?psc=1&pd_rd_i=B086GSG8DH&pd_rd_w=Ocdm2&pf_rd_p=48d372c1-f7e1-4b8b-9d02-4bd86f5158c5&pd_rd_wg=qkB2b&pf_rd_r=M%E2%80%A6>, May 6, 2020, 7 pages.
Geanbaye, Geanbaye Safety Full Face Shield Cap Detachable Baseball Cap Anti-Saliva Anti-Spitting Eye Protective Hat Windproof Dustproof <https://www.amazon.com/dp/B086DV32B8/ref=sspa_dk_detail_8?psc=1&pd_rd_i=B086DV32B8&pd_rd_w=MwjfT&pf_rd_p=48d372c1-f7e1-4b8b-9d02-4bd86f5158c5&pd_rd_wg=pxuOs&pf_rd_r=PNDA%E2%80%A6>, May 5, 2020, 8 pages.

Leigh Buchanan, These 2 Companies Are Making Face Shields for Everyone <https://www.inc.com/leigh-buchanan/face-shields-coronavirus-protection-open-source.html>, May 6, 2020, 8 pages.
Brim Shield, photographs, Apr. 21, 2020, 1 pages.
Hatshield, Shield Yourself With the Hatshield <https://www.hatshield.com/?gclid=CjwKCAjwp-X0BRAFEiwAheRui1u89v_3URuiwEVvBRGa9TaEfWoZVMJXRkWsZgPTUw-0fHJ5HD-8uhoCc84QAvD_BwE>, Apr. 17, 2020, 11 pages.
Eli N. Perencevich, Moving Personal Protective Equipment Into the Community Face Shields and Containment of COVID-19, Apr. 29, 2020, 2 pages.
Chang, Tian-Ci; Cao, Xun; Bao, Shan-Hu; Ji, Shi-Dong; Luo, Hong-Jie; Jin, Ping; Review of Thermochromic Vanadium Dioxide Based Smart Coatings: From Lab to Commercial Application; Dec. 16, 2017.
Saudi Basic Industries Corporation (SABIC); "The Department of Transportation [DOT] Guidebook"; Oct. 2016.
Hostaphan RBB, "Transparent, Temperature Stable Polyester Film for Cooking & Roasting Bags" Jul. 2016.
Hostaphan Win, "White, Long-Term Stable, Thermally Stable Polyester Film for PV Back Sheet Laminates"; Jul. 2016.
PCT Search Report & Written Opinion for PCT/US2019/054565 (Dec. 20, 2019).
PCT Search Report & Written Opinion for PCT/US2015/036248 (Sep. 16, 2015).
"Declaration of Jerome Aho"; Filed Aug. 3, 2007; Case 3:07-cv-00221-FDW-DCK; Includes: Exhibit A, Nascar Postcard (1 page), Exhibit B, 50th Anniversary Nascar letter sent Jan. 7, 1998 (1 page), and Exhibit C, Front page of "The Official Nascar Preview and Press Guide" (1 page); 9 pages.
*Racing Optics, Inc.* v. *David Leon O'Neal, Edward M. Wallace and Clear View Racing Optics, LLC*; Case 3:07 CV 221; Includes: Exhibit A, Wilson et al. U.S. Pat. No. 6,847,492; and Exhibit B, Wilson et al. U.S. Pat. No. 7,184,217; 34 pages.
International Search Report; International Application No. PCT/US99/95128; Date of Completion: Jan. 18, 2000; 54 pages.
International Search Report; International Application No. PCT/US02/10971; Date of Completion: Nov. 20, 2002; 3 pages.
International Search Report; International Application No. PCT/US03/16284; Date of Completion: Mar. 9, 2004; 3 pages.
European Search Report for Application No. 15809930.9-107 / 3157480 (Dec. 15, 2017).
Canadian Office Action for Application Serial No. 2,952,436 (Nov. 15, 2019).
Canadian Office Action for Application Serial No. 2,952,436 (May 3, 2019).
Australian Examination Report for Application Serial No. 2015277196 (Oct. 18, 2018).
www.wikipedia.org, Refractive Index, Oct. 31, 2014.
www.wikipedia.org. "Black Body", Jul. 2009, 11 pages.
www.wikipedia.org. "Infrared", Jul. 2009, 12 pages.
www.wikipedia.org. "PET Film (biaxially oriented)", Jul. 2009, 4 pages.
PCT International Application No. PCT/US99/25128 with International Search Report, Date of Completion Jan. 18, 2000, 54 Pages.
English translation of TW201027992, "Monitor Protection Device for a Flat Panel Display", 11 pgs.
Pulse Racing Innovations, EZ Tear Universal Single Pull Tearoff Ramp, webpage <https://www.pulseracinginnovations.com>, Dec. 30, 2020, 6 pages.
PCT International Search Report and Written Opinion for International Application No. PCT/US20/24639, Jun. 11, 2020, 13 pages.
PCT International Search Report and Written Opinion for International Application No. PCT/US2020/049919; Nov. 27, 2020.
Tian-Chi Chang, Xun Cao, Shan-Hu Bao, Shi=Dong Ji, Hong-Jie Luo, Ping Jin; "Review on Thermochromic Vanadium Dioxide Based Smart Coatings: From Lab to Commercial Application"; Dec. 16, 2017.
PCT International Search Report and Written Opinion for International Application No. PCT/US2020/062230; Feb. 8, 2021.
"Anti-reflective coating," Wikipedia, last updated Jul. 13, 2017 by Andy Dingley, <https://en.m.wikipedia. org/wiki/Anti-reflective_coating>.

(56) References Cited

OTHER PUBLICATIONS

"Monotonic function," Wikipedia, accessed May 24, 2017, <https://en.wikipedia.org/wiki/Monotonic_function>.

"Thin Film," Wikipedia, last updated Jun. 20, 2017, <https://en.wikipedia.org/wiki/Thin_film>.

"Tips to Get Quality Anti-Reflection Optical Coatings," Penn Optical Coatings, accessed May 24, 2017, <http://www.pennoc.com/tipsgetqualityantireflectionopticalcoatings/>.

Langlet, M., "Antireflective Films", from Chapter 15 of Handbook of Sol-Gel Science and Technology Processing Characterization and Applications, copyright 2005, pp. 332-334, 337, 339-341., taken from website <https://books.google.com/books?id=i9swy1D2HxIC&lpg=PA339&dq=AR%20thick%20film%20coatings&pg=PA339#v=onepage&q=AR%20thick%20film%20coatings&f=false>.

Li, H.-M. et al., "Influence of weight ratio in polymer blend film on the phase separation structure and its optical properties", The European Physical Journal Applied Physics, 45, 20501, published Jan. 31, 2009, EDP Sciences, 4 pages.

MDS Nordion, "Gamma Compatible Materials," Datasheet, Aug. 2007, 4 pages, <https://ab-div-bdi-bl-blm.web.cern.ch/Radiation/Gamma_Compatible_Materials_List_company.pdf>, retrieved on Sep. 29, 2021.

Zhang, Xin_Xiang et al., Abstract of "One-step sol-gel preparation of PDMS-silica ORMOSILs as environment-resistant and crack-free thick antireflective coatings," Journal of Materials Chemistry, Issue 26, 2012, <http://pubs.rsc.org/en/content/articlelanding/2012/m/c2jm31005h#!divAbstract>.

PCT International Search Report and Written Opinion for International Application No. PCT/US2017/044438, dated Oct. 23, 2017, 12 pages.

Chemical Book, "Benzophenone", https://www.chemicalbook.com/Chemical ProductProperty_EN_CB57 44679.htm, available at least as of 2017, accessed on line on Dec. 15, 2021 (Year: 2017).

Chemical Book, "Polymethylhydrosiloxane", https://www.chemicalbook.com/Chemical ProductProperty _En_ CB3694969.htm, available at least as of 2017, accessed online on Dec. 15, 2021 (Year: 2017).

Guide Chem, "UV Stabilizer", https://wap.guidechem.com/trade/uv-stabilizer-uv-absorber-ligh-id3578792.html, available at least as of 2018, accessed online on Dec. 15, 2021 (Year: 2018).

Hostaphan RBB biaxially oriented film data sheet (Year: 2011).

PCT International Search Report and Written Opinion for International Application No. PCT/US2020/024639; Jun. 11, 2020.

PCT International Search Report and Written Opinion for International Application No. PCT/US2021/026165, dated Jul. 9, 2021, 10 pages.

PCT International Search Report and Written Opinion for International Application No. PCT/US21/20421, May 20, 2021, 8 pages.

Wiseman, Sr., United States Statutory Invention Registration No. H1023, published Mar. 3, 1992, 7 pages.

Chemical Book, Bis(1,2,2,6,6-pentamethyl-4-piperidyl) sebacate, available online at least as of 2017, https://www.chemicalbook.com/ChemicalProductProperty_EN_CB8121619.htm, accessed online Mar. 15, 2022 (Year: 2017).

Pearson Dental, "UV Protection Face Shields", https://www.pearsondental.com/catalog/subcat_thumb.asp?majcatid=750&catid=I0149, available online at least as of Jan. 27, 2021 per Internet Archive, accessed online on Sep. 15, 2021. (Year: 2021).

Patent Cooperation Treaty, International Search Report and Written Opinion for International Application No. PCT/US2022/031823, mailed Jul. 14, 2022, 11 pages.

Patent Cooperation Treaty, International Search Report and Written Opinion for International Application No. PCT/US2022/046171, mailed Jan. 18, 2023, 15 pages.

Patent Cooperation Treaty, International Search Report and Written Opinion for International Application No. PCT/US2023/012316, mailed Apr. 14, 2023, 11 pages.

Patent Cooperation Treaty, International Search Report and Written Opinion for International Application No. PCT/US2023/26598, mailed Sep. 12, 2023, 7 pages.

State Intellectual Property Office, English translation of Second Examination Opinion Notice for Chinese Application No. 202080071482.3, Oct. 17, 2024, 18 pages.

State Intellectual Property Office, English translation of First Examination Opinion Notice for Chinese Application No. 202080071482.3, May 11, 2024, 22 pages.

European Patent Office, Extended European Search Report for European Application No. 20863965.8, Aug. 21, 2023, 8 pages.

European Patent Office, Communication pursuant to Article 94(3) EPC, Nov. 14, 2024, 4 pages.

Patent Cooperation Treaty, International Search Report and Written Opinion for International Application No. PCT/US2024/052837, mailed Nov. 14, 2024, 6 pages.

Canadian Intellectual Property Office, Office Action for Application No. 3,138,155, Dec. 19, 2024, 3 pages.

*Racing Optics, Inc.* v. *Aevoe Corp.* Dba Moshi; Case 2:15-cv-01774-RCJ-VCF; "Answer to Aevoe's Counterclaims—Jury Trial Demanded"; Nov. 2, 2015; 15 pages.

Gregory Brower et al.; "Complaint for Patent Infringement"; Sep. 15, 2015; 15 pages.

Jeffrey A. Silverstri et al.; "Answer to Complaint for Patent Infringement"; Oct. 7, 2015; 59 pages.

United States Patent and Trademark Office; Office Action for U.S. Appl. No. 15/090,681; Aug. 26, 2016; 8 pages.

List of References considered by Examiner for U.S. Appl. No. 15/090,681; Receipt date Jun. 30, 2016; 3 pages.

List of References considered by Examiner for U.S. Appl. No. 15/090,681; Receipt date Apr. 27, 2016; 4 pages.

Examiner's search strategy and results for U.S. Appl. No. 15/090,681; Aug. 21, 2016; 2 pages.

*Aevoe Corp.* v. *Racing Optics, Inc.*; Case No. IPR2016-01164; Petition for Inter Partes Review of U.S. Pat. No. 9,104,256 (including Exhibits 1001-1011 and Petitioner Power of Attorney Pursuant to 37 C.F.R. 42. 10(b) for Petition for Inter Partes Review); Jun. 21, 2016.

*Aevoe Corp.* v. *Racing Optics, Inc.*; Case No. IPR2016-01165; Petition for Inter Partes Review of U.S. Pat. No. 9,128,545(including Exhibits 1001-1006 and Petitioner Power of Attorney Pursuant to 37 C.F.R. 42. 10(b) for Petition for Inter Partes Review); Jun. 21, 2016.

*Aevoe Corp.* v. *Racing Optics, Inc.*; Case No. IPR2016-01166; Petition for Inter Partes Review of U.S. Pat. No. 9,274,625 (including Exhibits 1001-1011 and Petitioner Power of Attorney Pursuant to 37 C.F.R. 42. 10(b) for Petition for Inter Partes Review); Jun. 21, 2016.

Exhibit 1—Invalidity Contentions re: '545 Patent Under LPR 1-8(b)-(d); at least as early as Jul. 1, 2016.

Exhibit 2—Invalidity Contentions re: '256 Patent Under LPR 1-8(b)-(d); at least as early as Jul. 1, 2016.

Exhibit 3—Invalidity Contentions re: '620 Patent Under LPR 1-8(b)-(d); at least as early as Jul. 1, 2016.

Exhibit 4—Invalidity Contentions re: '625 Patent Under LPR 1-8(b)-(d); at least as early as Jul. 1, 2016.

Exhibit 1002—U.S. Pat. No. 5,364,671 to Gustafson; Case IPR2016-01745; Inter Partes Review of U.S. Pat. No. 8,974,620; at least as early as Sep. 7, 2016; pp. 1-6.

Exhibit 1004—U.S. Pat. No. 7,351,470 to Draheim et al; Case IPR2016-01745; Inter Partes Review of U.S. Pat. No. 8,974,620; at least as early as Sep. 7, 2016; pp. 1-15.

Exhibit 1001—U.S. Pat. No. 8,974,620 to Wilson et al.; Case IPR2016-01745; Inter Partes Review of U.S. Pat. No. 8,974,620; at least as early as Sep. 7, 2016; pp. 1-15.

Exhibit 1003—U.S. Pat. No. 6,250,765 to Murakami; Case IPR2016-01745; Inter Partes Review of U.S. Pat. No. 8,974,620; at least as early as Sep. 7, 2016; p. 1-8.

Exhibit 1005—U.S. Pat. No. 7,957,524 to Chipping; Case IPR2016-01745; Inter Partes Review of U.S. Pat. No. 8,974,620; at least as early as Sep. 7, 2017; pp. 1-20.

Aevoe Corp., Racing Optics, Inc.; Petition for Inter Partes Review; Case IPR2016-01745; Inter Partes Review of U.S. Pat. No. 8,974,620; at least as early as Sep. 7, 2016; pp. 1-55.

(56) References Cited

OTHER PUBLICATIONS

Exhibit 1006—Japanese Application No. JP 2002-328613 to Kitaguchi Translation; IPR2016-01745; at least as early as Sep. 7, 2016; pp. 1-10.
Exhibit 1009—U.S. Appl. No. 13/838,311; Interview Summary; Case IPR2016-01745; Inter Partes Review of U.S. Pat. No. 8,974,620; at least as early as Sep. 7, 2016; p. 1-3.
Exhibit 1010—U.S. Appl. No. 15/838,311; Notice of Allowance; Case IPR2016-01745; Inter Partes Review of U.S. Pat. No. 8,974,620; at least as early as Sep. 7, 2016; pp. 1-8.
*Aevoe Corp.* v. *Racing Optics, Inc.*; Declaration of Darran Cairns; Case IPR2016-01745; Inter Partes Review of U.S. Pat. No. 8,974,620; at least as early as Sep. 7, 2016; pp. 1-32.
*Aevoe Corp.* v. *Racing Optics, Inc.*; Petitioner's Power of Attorney; Case IPR2016-01745; Inter Partes Review of U.S. Pat. No. 8,974,620; at least as early as Sep. 7, 2016; pp. 1-3.
Exhibit 1007—U.S. Appl. No. 13/838,311; Response to Office Action; Case IPR2016-01745; Inter Partes Review of U.S. Pat. No. 8,974,620; at least as early as Sep. 7, 2016; p. 1-19.
Exhibit 1008—U.S. Appl. No. 13/838,311; Response and Request for Continued Examination; Case IPR2016-01745; Inter Partes Review of U.S. Pat. No. 8,974,620; at least as early as Sep. 7, 2016; pp. 1-21.
*Aevoe Corp.* v. *Racing Optics, Inc.*; Mandatory Notices; Case IPR2016-01745; Inter Partes Review of U.S. Pat. No. 8,974,620; at least as early as Sep. 7, 2016; pp. 1-4.
*Aevoe Corp.* v. *Racing Optics, Inc.*; Power of Attorney; Case IPR2016-01745; Inter Partes Review of U.S. Pat. No. 8,974,620; at least as early as Sep. 7, 2016; pp. 1-4.
*Aevoe Corp* v. *Racing Optics, Inc.*; Notice of Filing Date; Case IPR2016-01745; Inter Partes Review of U.S. Pat. No. 8,974,620; at least as early as Sep. 6, 2016; p. 1-5.
*Aevoe Corp* v. *Racing Optics, Inc.*; Decision; Case IPR2016-01164; Inter Partes Review of U.S. Pat. No. 9,104,256; at least as early as Nov. 7, 2016; p. 1-24.
*Aevoe Corp* v. *Racing Optics, Inc.*; Decision; Case IPR2016-01166; Inter Partes Review of U.S. Pat. No. 9,274,625; at least as early as Nov. 7, 2016; p. 1-23.

*Aevoe Corp* v. *Racing Optics, Inc.*; Decision; Case IPR2016-01165; Inter Partes Review of U.S. Pat. No. 9,128,545; at least as early as Nov. 7, 2016; p. 1-25.
Settlement and License Agreement, Dec. 21, 2007, 28 pgs.
United States Patent and Trademark Office; Office Action dated Dec. 21, 2016 pertaining to U.S. Appl. No. 15/090,681, filed Apr. 5, 2016; 8 pages.
PCT Search Report and Written Opinion for US2020/016245 (Apr. 28, 2020).
Professional Plastics (http://www.professionalplastics.com/MelinexPETFilmDupont) 2012.
Whitney, Frank D., Preliminary Injunction, Aug. 21, 2007, 5 pgs.
Higgins, John P., Answer and Counterclaims to First Amended Complaint, Sep. 4, 2007, 27 pgs.
Ballato, John, Expert Report of John Ballato, Ph.D., Nov. 12, 2007, 5 pgs.
Russell, Geoffrey A., Rebuttal Report of Geoffrey A. Russell, Ph.D., on issues raised in the Export Report of John Ballato, Ph.D., Nov. 21, 2007, 15 pgs.
Higgins, John P., Defendants' Second Supplement to Its Response to Plaintiffs' First Set of Interrogatories, Dec. 7, 2007, 25 pgs.
Barnhardt, John J. III, Redacted Version Defendants' Memorandum in Support of Motion for Partial Summary Judgment, Dec. 3, 2007, 36 pgs.
Higgins, John P., Defendants' Second Supplement to its Response to Plaintiffs' First Set of Interrogatories, Dec. 7, 2007, 26 pgs.
Whitney, Frank D., Consent Judgment Order, Jan. 3, 2008, 5 pgs.
Ballato, John, Supplemental Expert Report of John Ballato, Ph.D., Nov. 19, 2007, 10 pgs.
Moore, Steven D., Plaintiffs' Motion to Strike Defendants' New and Untimely Invalidity Theory, Dec. 19, 2007, 3 pgs.
Moore, Steven D., Plaintiffs' Brief in Support of Motion to Strike Defendants' New and Untimely Invalidity Theory, Dec. 19, 2007, 10 pgs.
Barnhardt, John J. III, Notice Pursuant to 35 U.S.C. 282, Dec. 18, 2007, 3 pgs.
Office Action for Canadian Patent Application No. 2,952,436; Jul. 8, 2020.
Examination Report for Australian Application No. 2023353041; mailed Feb. 5, 2026.
Japanese Patent Office; Office Action for Application No. JP 2025-517737; mailed Mar. 10, 2026.

* cited by examiner

LOW STATIC OPTICAL REMOVABLE LENS STACK

CROSS-REFERENCE TO RELATED APPLICATIONS

This application is a continuation of U.S. application Ser. No. 18/474,860 filed Sep. 26, 2023, which is a continuation of U.S. application Ser. No. 18/163,200 filed Feb. 1, 2023, now U.S. Pat. No. 11,808,952 issued Nov. 7, 2023, which relates to and claims the benefit of U.S. Provisional Application No. 63/377,155, filed Sep. 26, 2022 and entitled "LOW STATIC OPTICAL REMOVABLE LENS STACK," the entire contents of which is expressly incorporated by reference.

STATEMENT RE: FEDERALLY SPONSORED RESEARCH/DEVELOPMENT

Not Applicable

BACKGROUND

Current optical removable lens stacks, such as those currently manufactured by Racing Optics, Inc. of Las Vegas, Nevada, the disclosure of which is expressly incorporated herein by reference, have become the industry standard for vision and surface protection. One industrial area where such lens stacks have not been widely used is in sand blasting applications. Sand blasters wear protective helmets with a rigid face shield. Their face shield becomes abraded very quickly and vision is impaired. Ideally, they would incorporate current removable lens stacks to the face shield and remove one layer from the stack when their vision is impaired. However, it has been found that when you remove one layer from the stack, static electricity is generated and particles in the air stick to the remaining lens stack surface and face shield. Each time an outer layer is removed from the lens stack, more static electricity is generated and released. Static electricity must be eliminated in order for conventional lens stacks to be effectively used in sand blasting and in other industrial and medical environments where a static charge is not wanted.

Static electricity is the name given to a build-up of electrical charges on the surface of insulators (poor conductors of electricity). It is a surface phenomenon and occurs when two or more surfaces come in contact with each other and then are separated. These electrical charges are then released when each lens layer is removed. Polymers/plastics tend to have a negative charge. Air and skin tend to be positively charged. Surfaces with like polarity repel from each other. Surfaces with different polarity attract to each other. This is why you feel a static shock when removing two pieces of plastic from each other. The negative ions jump to the closest positive ions in the air and on your skin.

BRIEF SUMMARY

The present disclosure contemplates various systems and methods for overcoming the above drawbacks accompanying the related art. One aspect of the embodiments of the present disclosure is a removable lens stack. The removable lens stack may comprise a base layer including a substrate and an antistatic coating comprising quaternary ammonium cations, the antistatic coating being provided on a first side of the substrate. The removable lens stack may further comprise one or more removable lens layers stacked on top of the base layer, each removable lens layer including a substrate, an antistatic coating comprising quaternary ammonium cations, and an adhesive, the antistatic coating being provided on a first side of the substrate and the adhesive being provided on a second side of the substrate opposite the first side. The one or more removable lens layers may be stacked on top of the base layer such that the second side of the substrate of each removable lens layer faces the first side of the substrate of an immediately preceding layer from among the base layer and the one or more removable lens layers. Refractive indices of the substrate of the base layer, the substrate of each removable lens layer, and the adhesive of each removable lens layer may be matched to within 0.2.

Each removable lens layer may include an adhesive promoting treatment on the second side of the substrate between the substrate and the adhesive. Each removable lens layer may be corona treated on the second side of the substrate. The base layer may include an adhesive, the adhesive being provided on a second side of the substrate opposite the first side. The base layer may include an adhesive promoting treatment on the second side of the substrate between the substrate and the adhesive. The base layer may be corona treated on the second side of the substrate. The substrate of each removable lens layer may comprise a polyethylene terephthalate (PET) film or a thermoplastic polyurethane (TPU) film. The substrate of the base layer may comprise a PET film or a TPU film.

Another aspect of the embodiments of the present disclosure is a sand blasting helmet. The sand blasting helmet may comprise a face shield and one or more removable lens layers stacked on the face shield. Each removable lens layer may include a substrate, an antistatic coating comprising quaternary ammonium cations, and an adhesive, the antistatic coating being provided on a first side of the substrate and the adhesive being provided on a second side of the substrate opposite the first side. The one or more removable lens layers may be stacked on the face shield such that the second side of the substrate of a first of the one or more removable lens layers faces the face shield and the second side of the substrate of each removable lens layer after the first faces the first side of the substrate of an immediately preceding removable lens layer from among the one or more removable lens layers. Refractive indices of the substrate of each removable lens layer and the adhesive of each removable lens layer may be matched (e.g., to within 0.2).

Each removable lens layer may include an adhesive promoting treatment on the second side of the substrate between the substrate and the adhesive. Each removable lens layer may be corona treated on the second side of the substrate. The substrate of each removable lens layer may comprise a PET film or a TPU film.

Another aspect of the embodiments of the present disclosure is a method of manufacturing a removable lens stack. The method may comprise providing an antistatic coating on a first substrate, the antistatic coating comprising quaternary ammonium cations. The method may further comprise providing an adhesive on a second substrate and stacking the second substrate on the first substrate such that the adhesive provided on the second substrate faces the antistatic coating provided on the first substrate. Refractive indices of the first substrate, the second substrate, and the adhesive may be matched (e.g., to within 0.2).

The method may comprise providing an adhesive promoting treatment on the second substrate prior to providing the adhesive. The method may comprise corona treating the second substrate prior to providing the adhesive. The first and/or second substrate may comprise a PET film or a TPU film.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of a removable lens stack that is affixable to or usable as a face shield of a sandblasting helmet, along with methods of manufacture and use thereof. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that relational terms such as first and second and the like are used solely to distinguish one from another entity without necessarily requiring or implying any actual such relationship in order between such entities.

Figures 1, 2:
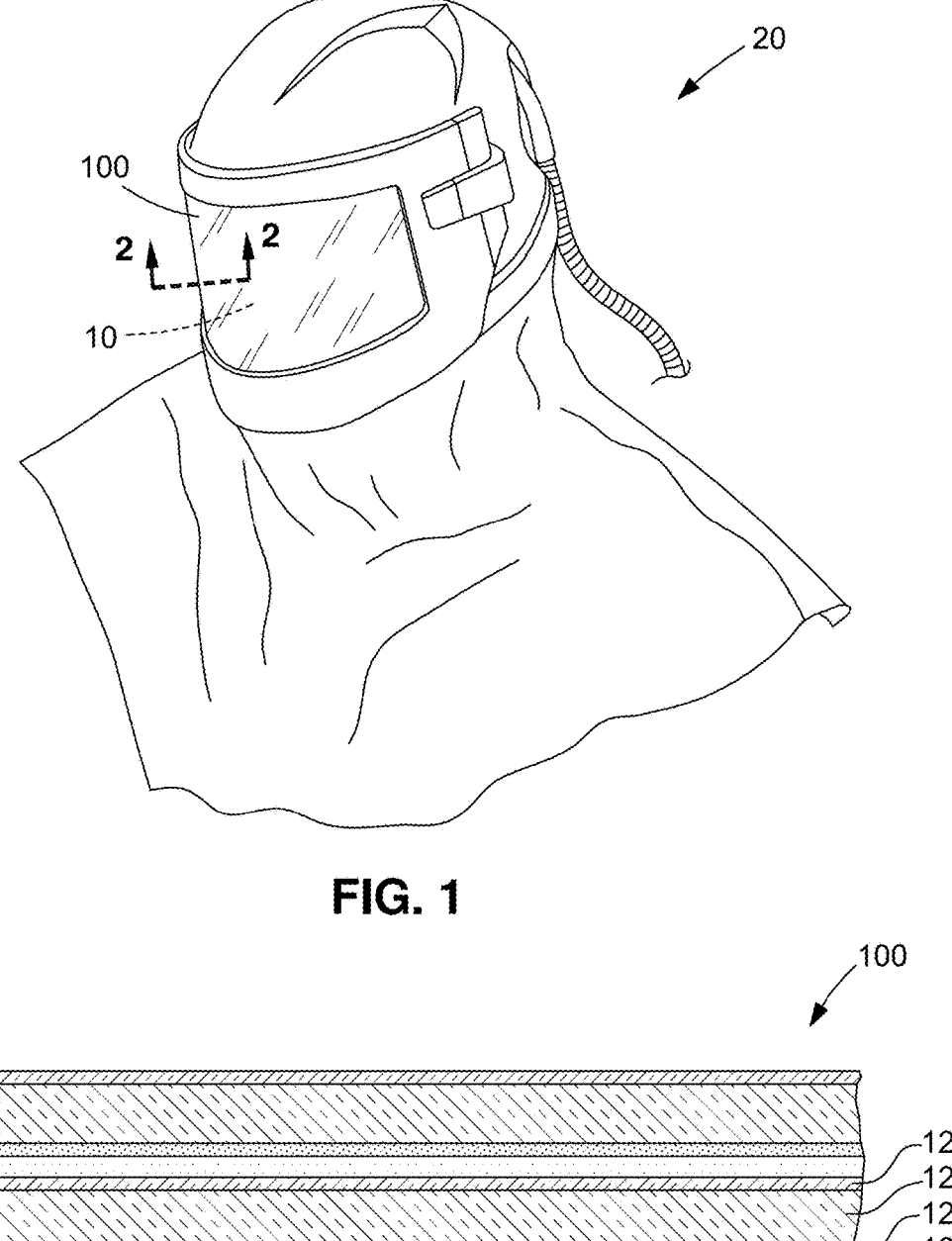
FIG. 1 shows a removable lens stack applied to a face shield of a sandblasting helmet in accordance with an embodiment of the present disclosure.
FIG. 2 is a cross-sectional view of the removable lens stack and face shield taken along the line 2-2 in FIG. 1.

FIG. 1 shows a removable lens stack 100 applied to a face shield 10 of a sandblasting helmet 20 in accordance with an embodiment of the present disclosure, with FIG. 2 being a cross-sectional view thereof. The removable lens stack 100 may include a base layer 110 that may be affixed (e.g., mechanically or with adhesive) to the face shield 10 or other surface such as a goggle lens or visor or a transparent window of a helmet, hood, or gown, for example, especially those for use in sandblasting or other activities that would benefit from avoiding the buildup of static electricity. Alternatively, the base layer 110 of the removable lens stack 100 may itself serve as the lens, visor, face shield, or other surface, e.g., by being attached at a perimeter thereof to a frame of the helmet, hood, gown, goggle, or other article. Stacked on top of the base layer 110, the removable lens stack 100 may further include one or more removable lens layers 120a, 120b, etc. (collectively 120), each comprising a substrate 122 such as a polyethylene terephthalate (PET) or thermoplastic polyurethane (TPU) film, for example, and an adhesive 124 for adhering the removable lens layer 120 to the previous adhesive lens layer 120 (or, in the case of the innermost removable lens layer 120, to the base layer 110). As debris accumulates on the outermost removable lens layer 120 during sandblasting or other activities, or as the layer 120 becomes pitted or otherwise damaged, the wearer may simply tear it off to reveal the next pristine lens layer 120 (or base layer 110) underneath. Depending on the number of removable lens layers 120 in the stack, the process may be repeated several times before replacing the stack 100.

Figure 3:
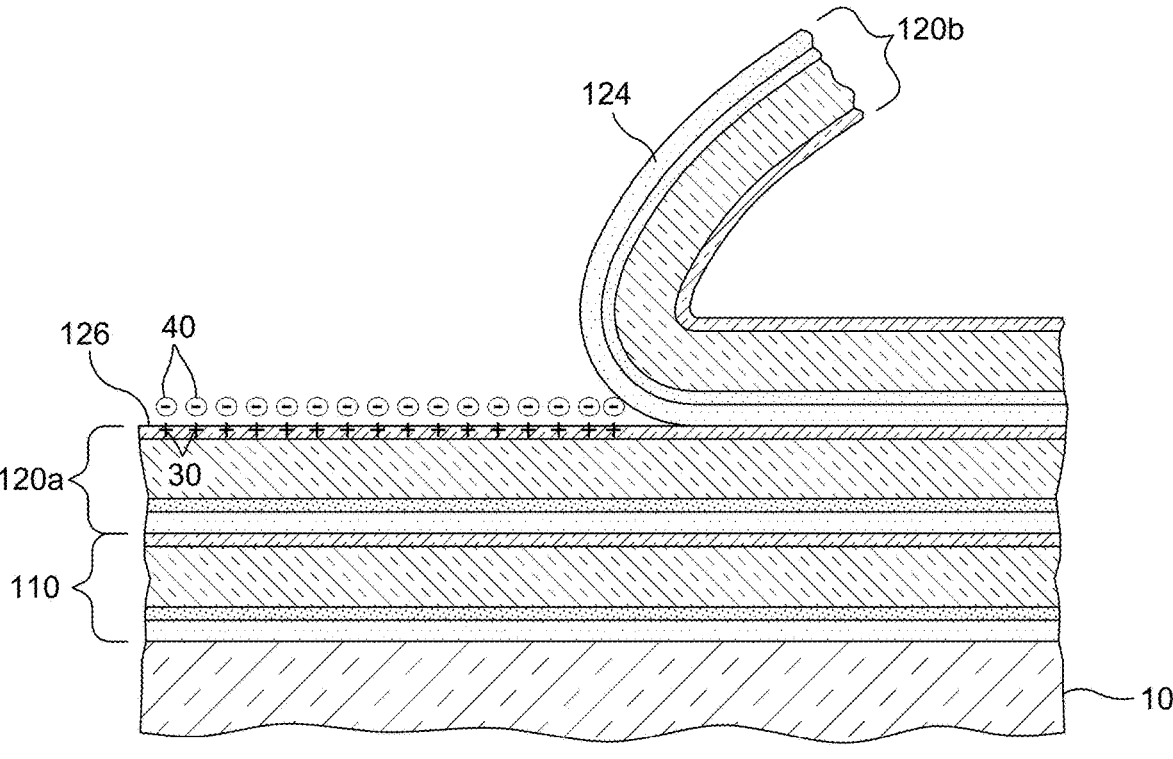
FIG. 3 is another cross-sectional view of the removable lens stack and face shield in which an outermost layer of the removable lens stack is being peeled off.

FIG. 3 is another cross-sectional view of the removable lens stack 100 and face shield 10 in which an outermost layer 120b of the removable lens stack 100 is being peeled off. In order to prevent the buildup of static electricity that might otherwise result from the peeling off of each removable lens layer 120, each removable lens layer 120 may further include an antistatic coating 126 as shown in FIGS. 2 and 3. The antistatic coating 126 may comprise positively charged ions 30, e.g., polyatomic ions such as quaternary ammonium cations (QAC), which may be dispersed in an acrylic or urethane polymer, for example. By embedding positive ions in the mating surface between layers in this way, the static electricity caused by the separation of the negatively charged (typically plastic) lenses 122 may be neutralized. As illustrated in FIG. 3, for example, the antistatic coating 126 of the removable lens layer 120a that is to remain on the stack 100 comes in direct contact with the removable adhesive 124 of the removable lens layer 120b that is being peeled off. The positive ions 30 embedded in the antistatic coating 126 attract negative ions 40 that are released from the removable lens layer 120b when the layers 120 are peeled apart. Whereas the negative ions 40 would normally create a net negative charge on the remaining removable lens layer 120a, resulting in an undesired attraction of dust and debris from the air, the negative ions 40 are instead attracted to and neutralized by the positive ions 30 of the remaining removable lens layer 120a. In this way, most, if not all, of the charge may be completely eliminated when a layer 120 is removed from the stack 100, allowing for a static-free embodiment for sandblasting or other activity where static buildup is undesirable.

In addition to the antistatic coating 126, various other surface treatments may be applied to the removable lens layers 120, typically in the form of very thin coatings that help promote an outcome on a surface of the lens layer 120. Of particular use in the context of the disclosed removable lens stack 100, each removable lens layer 120 may further include an adhesive promoting treatment 128 between the substrate 122 and the adhesive 124. The adhesive promoting treatment 128 may be a very thin (e.g., 5-10 nm) rough coat of acrylic or polyurethane, for example. Alternatively, the substrate 122 may undergo a corona treatment to promote adhesion. By promoting the adhesion of the substrate 122, it can be ensured that the adhesive 124 stays with the substrate 122 as a given layer (e.g., layer 120b) is removed from the layer underneath (e.g., layer 120a). Advantageously, this may prevent unwanted residue from transferring to the next layer 120, which could impair the vision of the sandblaster or other wearer of the lens stack 100. Such a clean removal may typically result in an increased buildup of static electricity, making the disclosed antistatic coating(s) 126 especially beneficial in the context of removable lens layers 120 that have been treated to promote adhesion.

Like the removable lens layers 120, the base layer 110 of the removable lens stack 100 may comprise a substrate 112 and antistatic coating 116 that may be the same as the substrate 122 and antistatic coating 126 of each removable lens layer 120. If the base layer 120 is to be affixed to a face shield 10 or other surface, the base layer 110 may further comprise an adhesive 114 (e.g., a self-wetting removable adhesive) and, optionally, an adhesive promoting treatment 118 that may be the same as the adhesive 124 and adhesive promoting treatment 128 of each removable lens layer 120.

In order to keep optical distortion as low as possible, the refractive indices of the substrates 112, 122 and any adhesives 114, 124 that are used may be matched (e.g., to within 0.2) as described in U.S. Pat. No. 9,295,297, entitled "Adhesive Mountable Stack of Removable Layers," the entire contents of each of which is incorporated by reference herein.

Figure 4:
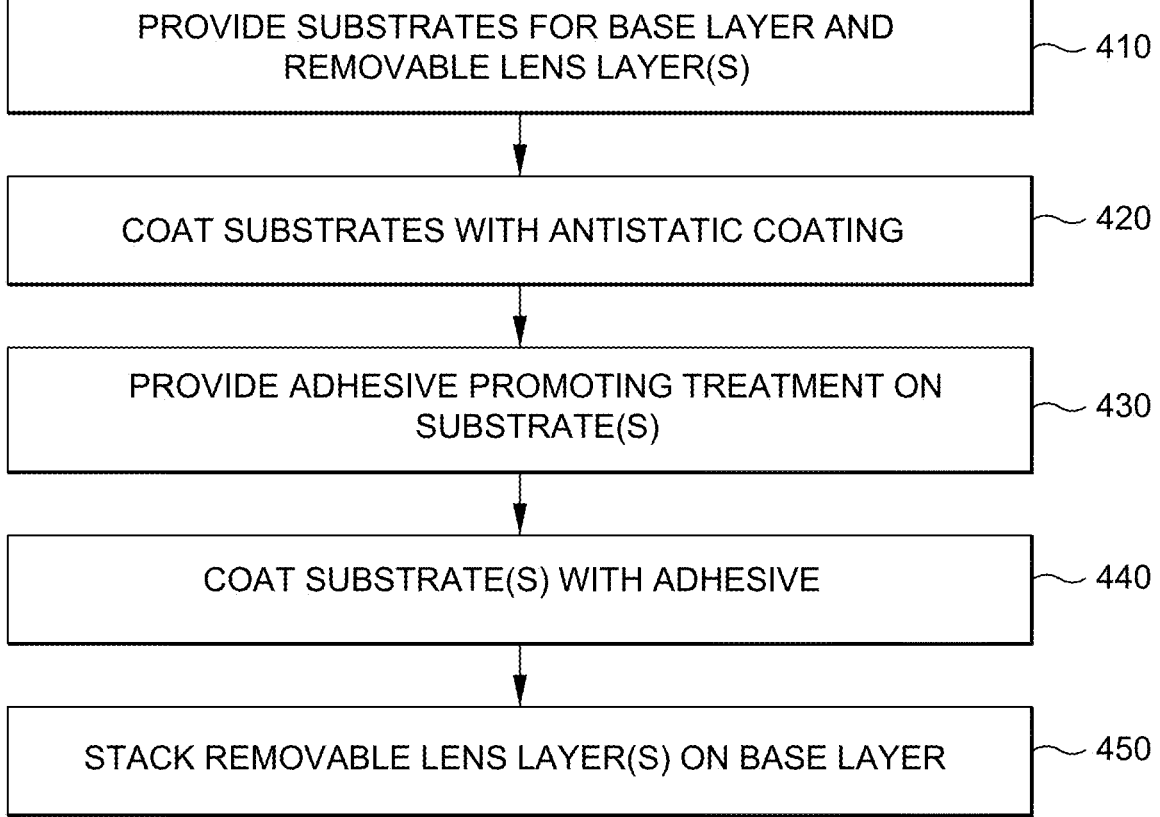
FIG. 4 is an example operational flow according to an embodiment of the present disclosure.

FIG. 4 is an example operational flow according to an embodiment of the present disclosure. The operational flow of FIG. 4 may serve as an example method of manufacturing the removable lens stack 100 described in relation to FIGS. 1-3. The operational flow may begin with providing the substrates 112, 122 to be used in the base layer 110 and each removable lens layer 120 (step 410). The substrates 112, 122, which may be made of PET (e.g., biaxially-oriented PET or BoPET) or TPU as noted above, may be selected for particular modulation transfer function (MTF) data or may be fabricated while actively monitoring the MTF data in a continuous or batch-to-batch process as described in any of U.S. Patent Application Pub. No. 2021/0162645, entitled "Method and Apparatus for Reducing Non-Normal Incidence Distortion in Glazing Films," U.S. Patent Application Pub. No. 2022/0032591, also entitled "Method and Apparatus for Reducing Non-Normal Incidence Distortion in Glazing Films," or U.S. Patent Application Pub. No. 2021/0283994, entitled "Protective Barrier for Safety Glazing," the entire contents of each of which is incorporated by reference herein. In this regard, providing the substrate 112, 122 may include, for example, melting a resin, extruding the melted resin through a die to produce a film, and cooling the film. Examples of TPU films, specifically, may be found in commonly owned U.S. patent application Ser. No. 17/937, 371, entitled "Multi-layer Windshield Film having Progressive Thickness Layers," the entire contents of which is incorporated by reference herein.

Each substrate 112, 122 may be coated with an antistatic coating 116, 126 on one side thereof (step 420). The antistatic coating 116, 126 may comprise an acrylic or urethane polymer with positively charged ions 30 dispersed therein, which may be coated on the substrate by spin coating, dip coating, or vacuum deposition, for example. The ions 30 may be the same as those found in consumer products such as dryer sheets or hair conditioner, for example, but advantageously may be dispersed in a very thin (e.g., 5-10 nm), optically clear coating 116, 126, which may be refractive index matched (e.g., to within 0.2) with the substrate 112, 122 for reduced optical distortion. On the opposite side, each removable lens layer substrate 122 (and optionally the base layer substrate 112) may further be provided with an adhesive promoting treatment 128, 118 (step 430) such as a rough coat of acrylic or polyurethane or a corona treatment, for example, and subsequently coated with an adhesive 124, 114 (step 440), which is preferably wet deposited but may be applied according to any appropriate methods including spin coating, dip coating, or vacuum deposition. The adhesive 114, 124 may be a wet mount adhesive as disclosed, for example, in U.S. Pat. Nos. 9,128,545, 9,274,625, and 10,620,670, all entitled "Touch Screen Shield," the entire contents of each of which is incorporated by reference herein, or a dry mount adhesive as disclosed, for example, in the above-mentioned '297 patent. The adhesive 114, 124 may be an acrylic or silicon adhesive such as an acrylic pressure sensitive adhesive (PSA) or a silicon PSA and may, in particular, be an optically clear adhesive (OCA).

The operational flow of FIG. 4 may continue with stacking one or more of the resulting lens(es) 120, including substrate(s) 122, adhesive(s) 124, antistatic coating(s) 126, and optional adhesive promoting treatment(s) 128, on the base layer 110 including the substrate 112 and antistatic coating 116 (and in some cases adhesive 114 with optional adhesive promoting treatment 118) to produce a removable lens stack 100 (step 450). Example stacking and adhesive curing processes that may be used in connection with producing the removable lens stack 100 are described in commonly owned U.S. patent application Ser. No. 17/823, 413, entitled "Stack of Sterile Peelable Lenses with Low Creep," the entire contents of which is incorporated by reference herein. If an adhesive 114 is used on the base layer 110, a release liner may be used to protect the adhesive 114 prior to application of the removable lens stack 100 on a face shield or other article. In addition to the substrates 112, 122, adhesive(s) 114, 124, antistatic coating(s) 116, 126, and adhesive promoting treatment(s) 118, 128 described herein, it is contemplated that the base layer 110 and/or each removable lens layer 120 may further include other layers or additives, such as a hard coat as described in the above-mentioned '994 publication, anti-reflective coating(s) as described in U.S. Patent Application Pub. No. 2020/0124768, entitled "Transparent Covering Having Anti-Reflective Coatings," a thermochromic film as described in U.S. Patent Application Pub. No. 2021/0070017, entitled "Nano Particle Solar Control Film," a UV blocking layer or additive as described in commonly owned U.S. patent application Ser. Nos. 17/342,373 and 17/938,308, both entitled "Low Haze UV Blocking Removable Lens Stack," moth eye and/or fluoropolymer coating(s) as described in U.S. Pat. No. 11,307,329, entitled "Low Reflectance Removable Lens Stack," and/or coatings of differing refractive index as described in U.S. Pat. No. 10,427,385 and 11,141,959 and U.S. Patent Application Pub. No. 2021/0402744, entitled "Low Reflectance Optical Web," the entire contents of each of which is incorporated by reference herein. In order to keep optical distortion as low as possible, the refractive indices of the substrates 112, 122, adhesive(s) 114, 124, antistatic coating(s) 116, 126, adhesive promoting treatment(s) 118, 128, and any other layers or additives within each layer 110, 120 and likewise the refractive indices between each of the layers 110, 120 of the stack 100 may be matched (e.g., to within 0.2) as described in the above-mentioned '297 patent.

In the example of FIGS. 2 and 3, two removable lens layers 120 are shown, which are stacked on the base layer 110 to form the removable lens stack 100. However, it is contemplated that there may be more than two removable lens layers 120 (e.g., three, four, or more) or that there may be only a single removable lens layer 120. It should also be noted that not all removable lens layers 120 need necessarily be identical. For example, the outermost removable lens layer 120 may omit the anti-static coating 126 since, in the case of the outermost layer 120, the increased buildup of static charge caused by the previous removal of a layer 120 is not a concern. It is also contemplated that the removable lens layers 120 may vary in thickness, for example, as described in the above mentioned '371 application, or may have peripheral tabs for easy tear-off that might vary in their position along the periphery of the layers 120. In this regard, an example system that may allow for easy tear-off when the removable lens stack 100 is affixed to a face shield or other article is described in U.S. Patent Application Pub. No. 2022/0304412, entitled "Tearoff Tab Tensioner," the entire contents of which is incorporated by reference herein.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A face shield for use in a medical environment, the face shield comprising:

a transparent window; and two or more removable lens layers stacked on the transparent window, each removable lens layer including a substrate, an antistatic coating, and an adhesive, the antistatic coating being provided on a first side of the substrate and the adhesive being provided on a second side of the substrate opposite the first side, the two or more removable lens layers being stacked on the transparent window such that the second side of the substrate of a first of the two or more removable lens layers faces the transparent window and the adhesive provided on the second side of the substrate of each removable lens layer after the first faces and contacts the antistatic coating provided on the first side of the substrate of an immediately preceding removable lens layer from among the two or more removable lens layers.

2. The face shield of claim 1, wherein each removable lens layer further includes an adhesive promoting treatment on the second side of the substrate between the substrate and the adhesive.

3. The face shield of claim 1, wherein each removable lens layer is corona treated on the second side of the substrate.

4. The face shield of claim 1, wherein the substrate of each removable lens layer comprises a polyethylene terephthalate (PET) film.

5. The face shield of claim 1, wherein the substrate of each removable lens layer comprises a thermoplastic polyurethane (TPU) film.

6. The face shield of claim 1, wherein the antistatic coating comprises positively charged ions.

7. A hood comprising the face shield of claim 1.

8. A face shield for use in a medical environment, the face shield comprising:

a transparent window having an antistatic coating on a first side thereof; and one or more removable lens layers stacked on the transparent window, each removable lens layer including a substrate and an adhesive, the one or more removable lens layers being stacked on the transparent window such that the adhesive of a first of the one or more removable lens layers faces and contacts the antistatic coating provided on the first side of the transparent window.

9. The face shield of claim 8, wherein each removable lens layer further includes an adhesive promoting treatment between the substrate and the adhesive.

10. The face shield of claim 8, wherein the substrate of each removable lens layer is corona treated.

11. The face shield of claim 8, wherein the substrate of each removable lens layer comprises a polyethylene terephthalate (PET) film.

12. The face shield of claim 8, wherein the substrate of each removable lens layer comprises a thermoplastic polyurethane (TPU) film.

13. The face shield of claim 8, wherein the antistatic coating comprises positively charged ions.

14. A hood comprising the face shield of claim 8.

15. A removable lens stack for use on a face shield in a medical environment, the removable lens stack comprising:

two or more removable lens layers, each removable lens layer including a substrate, an antistatic coating, and an adhesive, the antistatic coating being provided on a first side of the substrate and the adhesive being provided on a second side of the substrate opposite the first side, the two or more removable lens layers being stacked such that the adhesive provided on the second side of the substrate of each removable lens layer after the first faces and contacts the antistatic coating provided on the first side of the substrate of an immediately preceding removable lens layer from among the two or more removable lens layers.

16. The removable lens stack of claim 15, wherein each removable lens layer further includes an adhesive promoting treatment on the second side of the substrate between the substrate and the adhesive.

17. The removable lens stack of claim 15, wherein each removable lens layer is corona treated on the second side of the substrate.

18. The removable lens stack of claim 15, wherein the substrate of each removable lens layer comprises a polyethylene terephthalate (PET) film.

19. The removable lens stack of claim 15, wherein the substrate of each removable lens layer comprises a thermoplastic polyurethane (TPU) film.

20. The removable lens stack of claim 15, wherein the antistatic coating comprises positively charged ions.

21. A hood comprising:

a face shield; and the removable lens stack of claim 15 affixed to the face shield.

* * * * *